(12) United States Patent
Matsunaga

(10) Patent No.: US 7,909,650 B2
(45) Date of Patent: Mar. 22, 2011

(54) CARD CONNECTOR PROVIDED WITH FUNCTION FOR DETECTING AN INTEGRATED CIRCUIT CARD

(75) Inventor: Akihiro Matsunaga, Tokyo (JP)

(73) Assignee: Japan Aviation Electronics Industry Limited, Tokyo (JP)

( * ) Notice: Subject to any disclaimer, the term of this patent is extended or adjusted under 35 U.S.C. 154(b) by 0 days.

(21) Appl. No.: 12/594,857

(22) PCT Filed: Mar. 13, 2008

(86) PCT No.: PCT/JP2008/054586
§ 371 (c)(1),
(2), (4) Date: Oct. 6, 2009

(87) PCT Pub. No.: WO2008/126612
PCT Pub. Date: Oct. 23, 2008

(65) Prior Publication Data
US 2010/0112835 A1      May 6, 2010

(30) Foreign Application Priority Data
Apr. 9, 2007    (JP) ................................ 2007-101778

(51) Int. Cl.
*H01R 24/00*      (2006.01)
(52) U.S. Cl. ..................................... 439/630; 439/924.1
(58) Field of Classification Search .................. 439/630, 439/331, 326, 924.1
See application file for complete search history.

(56) References Cited

U.S. PATENT DOCUMENTS

| 5,380,997 | A | * | 1/1995 | Hania et al. | 235/485 |
| 5,463,210 | A | * | 10/1995 | Imura | 235/441 |
| 5,945,662 | A | * | 8/1999 | Vallat | 235/492 |
| 6,409,529 | B1 | * | 6/2002 | Liu et al. | 439/188 |
| 7,048,566 | B2 | * | 5/2006 | Natori | 439/326 |
| 7,682,197 | B2 | * | 3/2010 | Wang | 439/630 |
| 2006/0046574 | A1 | * | 3/2006 | Nozue et al. | 439/630 |
| 2006/0116027 | A1 | * | 6/2006 | Tseng et al. | 439/630 |
| 2010/0035474 | A1 | * | 2/2010 | Xu et al. | 439/630 |

FOREIGN PATENT DOCUMENTS

| JP | 6-139414 A | 5/1994 |
| JP | 2001-143788 A | 5/2001 |
| JP | 2007-164418 A | 6/2007 |
| WO | WO 2007059702 A1 * | 5/2007 |

* cited by examiner

*Primary Examiner* — Hae Moon Hyeon
(74) *Attorney, Agent, or Firm* — Holtz, Holtz, Goodman & Chick, PC

(57) ABSTRACT

A card connector is provided which has a reduced size. The card connector includes a plurality of contacts which are held in a housing including an accommodating space for accommodating an electronic card. The plurality of contacts include a first switch contact and a second switch contact which are electrically connected to each other via a ground connection pad of the electronic card when the electronic card is accommodated in the accommodating space.

6 Claims, 12 Drawing Sheets

CARD CONNECTOR PROVIDED WITH FUNCTION FOR DETECTING AN INTEGRATED CIRCUIT CARD

CROSS-REFERENCE TO RELATED APPLICATIONS

This application is a U.S. National Phase Application under 35 USC 371 of International Application PCT/JP2008/054586 filed Mar. 13, 2008.

FIELD OF THE INVENTION

The present invention relates to a connector for an electronic card, such as an Integrated Circuit (IC) card, and more particularly to a connector for a card, which has a function of detecting an IC card.

BACKGROUND ART

Conventionally, there has been proposed a card connector which includes a housing, contact terminals, a contact spring piece, and a fixing piece (see Patent Literature 1).

The housing includes a pair of side walls, an abutment wall which is orthogonal to the pair of side walls and connects the side walls to each other, and a lower board which is connected to the side walls and a bottom of the abutment wall.

Inner surfaces of the side walls are formed with guiding grooves, respectively, and the guiding grooves guide an IC card in an inserting/removing direction and support the same.

A plurality of grooves are formed in the lower board of the housing at equally-spaced intervals. The plurality of grooves extend in the direction of inserting/removing the IC card.

The contact terminals include a contact terminal for power supply and contact terminals for signals. The contact terminals are press-fitted in the grooves in the lower board and are held therein.

The contact spring piece is substantially U-shaped in plan view, and is accommodated in an accommodating space formed in the abutment wall of the housing. The contact spring piece has one end formed with a fixing portion which is fixed to the abutment wall, and the other end formed with an abutment portion which is brought into abutment with a front end surface of the IC card. The abutment portion can be displaced along the direction of inserting/removing the IC card.

The fixing piece has one end formed with a fixing portion which is fixed to one of the side walls, and the other end formed with a contact piece.

The contact spring piece and the fixing piece form a switch for recognizing whether or not the card connector is loaded with the IC card.

When the IC card is inserted into the housing, the IC card is guided to the abutment wall by the guiding grooves in the pair of side walls.

At this time, the abutment portion of the contact spring piece is pressed backward by the front end surface of the IC card, and is brought into contact with the contact piece of the fixing piece. As a result, the switch is closed, whereby it is possible to detect that the card connector is loaded with the IC card.

Patent Literature 1: Japanese Laid-Open Patent Publication (Kokai) No. 2001-143788 (see paragraphs 0021 to 0029, FIGS. 2 and 4)

DISCLOSURE OF THE INVENTION

Problem to be Solved by the Invention

In the above-described connector, in addition to the contact terminals for signals and the contact terminal for power supply, to detect the IC card, two components, i.e. the contact spring piece and the fixing piece are required, and at the same time, a particular accommodating space for accommodating the abutment portion of the contact spring piece in a manner elastically deformable in the direction of inserting/removing the IC card is required.

Therefore, there is a problem that the conventional card connector is increased in size.

The present invention has been made in view of these circumstances, and an object thereof is to provide a card connector which is capable of reducing the size thereof.

To attain the object, the invention provides a card connector that has an accommodating portion for accommodating an electronic card having a plurality of contacts and a plurality of connection pads, and includes a housing for holding the plurality of contacts, characterized in that the plurality of contacts include a power-side detection contact and a ground-side detection contact which are electrically connected to each other by being brought into contact with a desired connection pad of the plurality of connection pads when the electronic card is accommodated in the accommodating portion.

As described above, since the plurality of contacts include the power-side detection contact and the ground-side detection contact, which are electrically connected to each other by being brought into contact with a desired connection pad of the plurality of connection pads when the electronic card is accommodated in the accommodating portion, it is not required to elastically deform one of the power-side detection contact and the ground-side detection contact and bring the same into contact with the other of the detection contacts.

Preferably, at least one of the power-side detection contact and the ground-side detection contact has a same shape as that of ones of the plurality of contacts other than the power-side detection contact and the ground-side detection contact.

Preferably, a direction of inserting/removing the electronic card into/from the accommodating portion substantially coincides with a direction of a thickness of the housing, the plurality of contacts including signal contacts, and a power contact, the signal contacts being brought into contact with signal connection pads of the plurality of connection pads, and the power contact being brought into contact with a power connection pad of the plurality of connection pads, when the electronic card is accommodated in the accommodating portion, a location of a contact portion of the ground-side detection contact in the direction of the thickness of the housing being substantially the same as a location of a contact portion of the power contact in the direction of the thickness of the housing, and at the same time being higher than locations of respective contact portions of the signal contacts in the direction of the thickness of the housing, the locations of the contact portions of the signal contacts in the direction of the thickness of the housing being higher than the location of the contact portion of the power-side detection contact in the direction of the thickness of the housing.

Preferably, a direction of inserting/removing the electronic card into/from the accommodating portion substantially coincides with a longitudinal direction of the housing, the plurality of contacts including signal contacts, and a power contact, the signal contacts being brought into contact with signal connection pads of the plurality of connection pads, and the power contact being brought into contact with a power connection pad of the plurality of connection pads, when the electronic card is accommodated in the accommodating portion, a location of a contact portion of the ground-side detection contact in the longitudinal direction of the housing being substantially the same as a location of a contact portion of the power contact in the longitudinal direction of the housing, and at the same time being forward of locations of respective contact portions of the signal contacts in the longitudinal direction of the housing, the locations of the contact portions of the signal contacts in the longitudinal direction of the housing being forward of the location of the contact portion of the power-side detection contact in the longitudinal direction of the housing.

Effects of the Invention

According to the present invention, it is possible to reduce the size of the connector.

BEST MODE FOR CARRYING OUT THE INVENTION

Hereafter, an embodiment of the present invention will be described with reference to the drawings.

Figure 1:
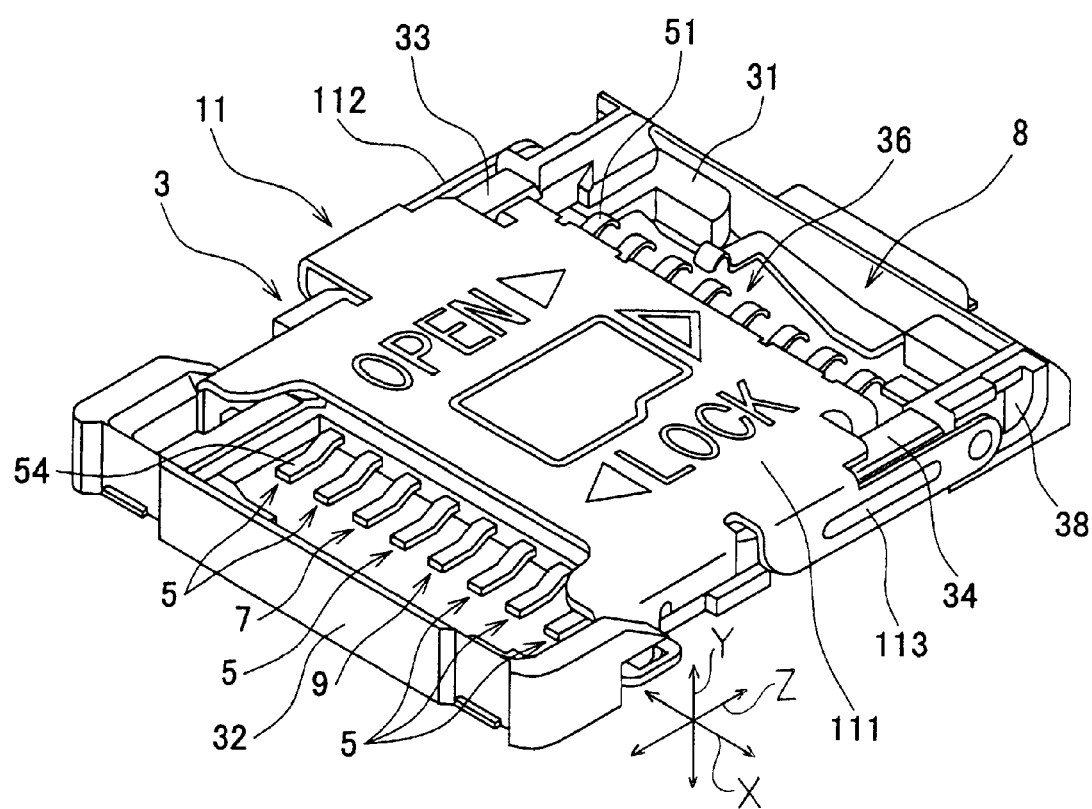
FIG. 1 is a perspective view of a card connector according to a first embodiment of the present invention, as taken from above.
Figure 2:
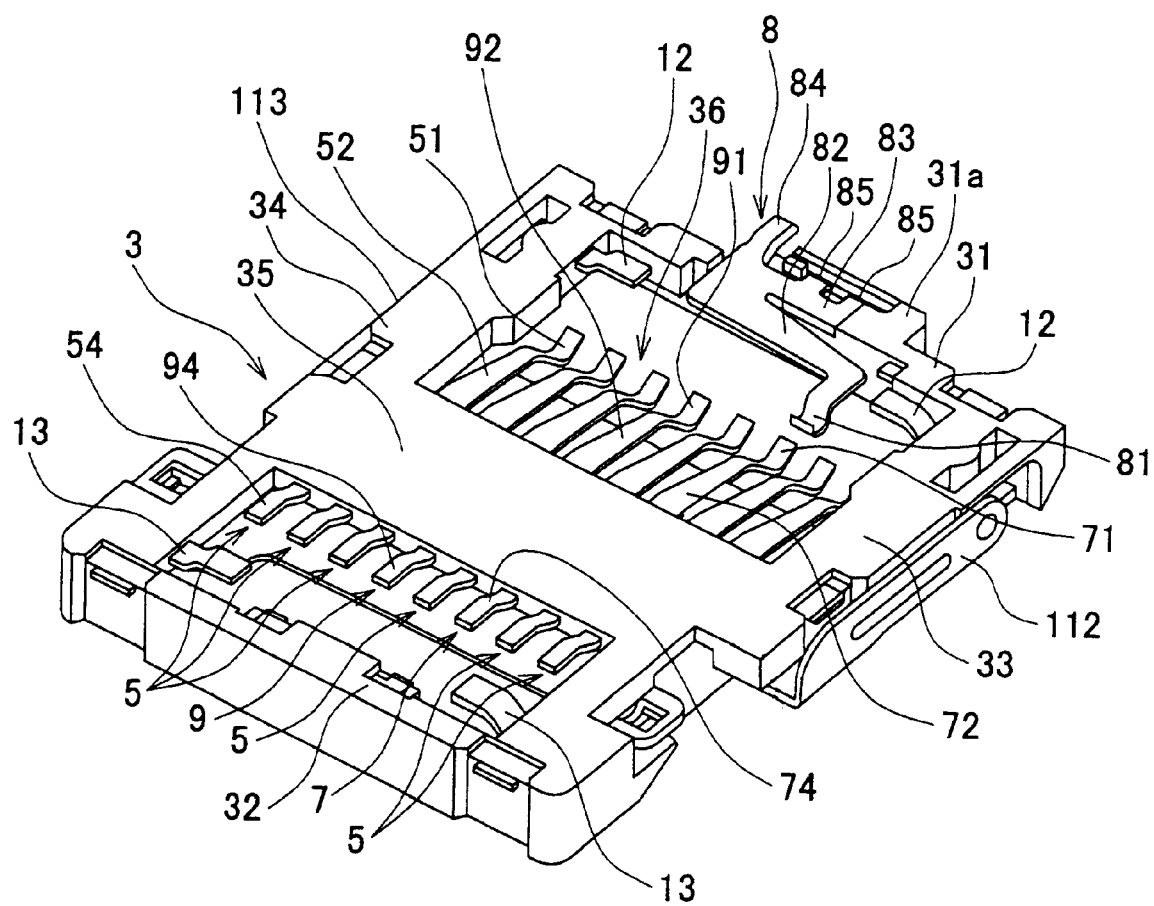
FIG. 2 is a perspective view of the card connector shown in FIG. 1, as taken from below.
Figure 3:
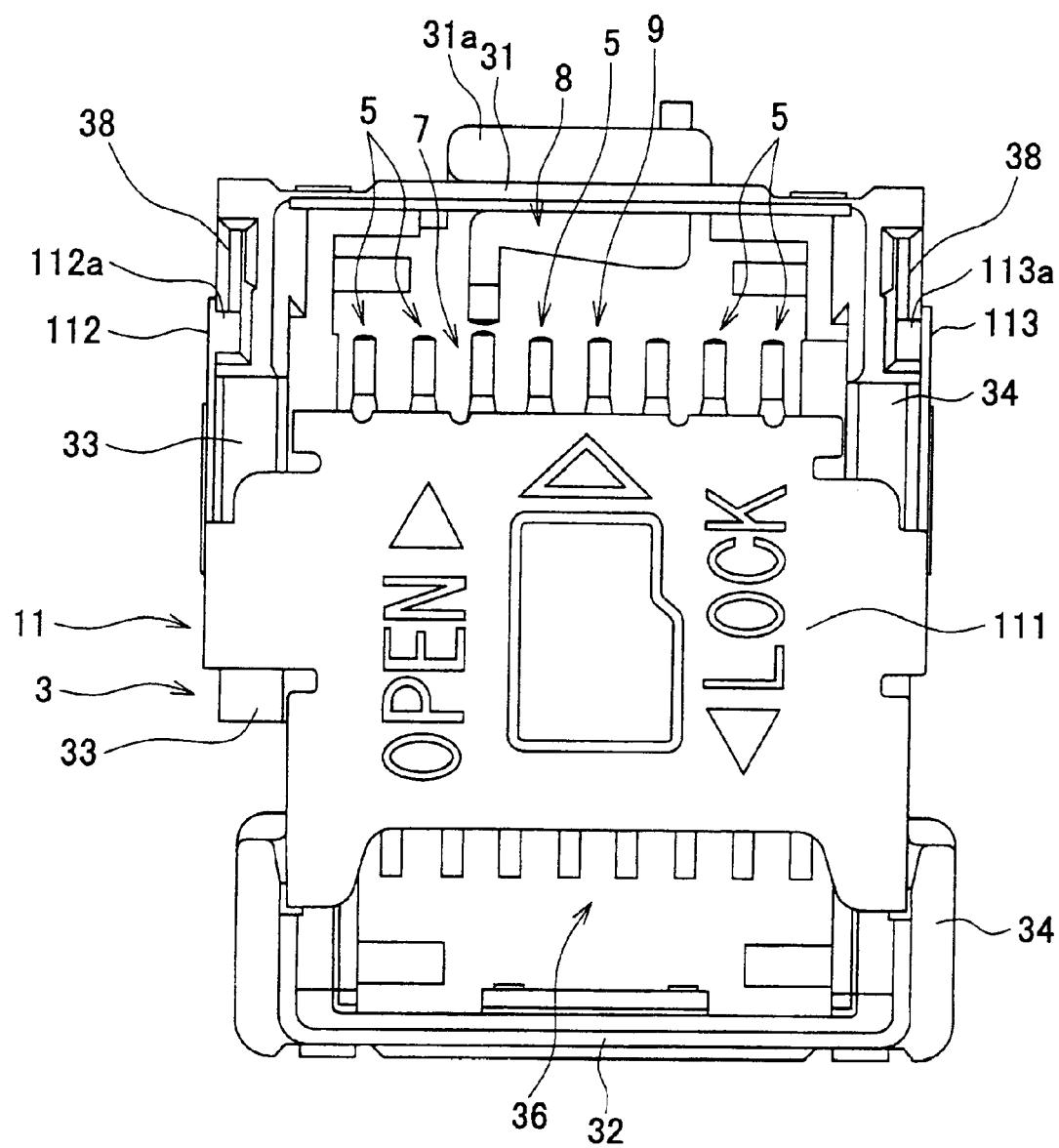
FIG. 3 is a plan view of the card connector shown in FIG. 1.
Figure 4:
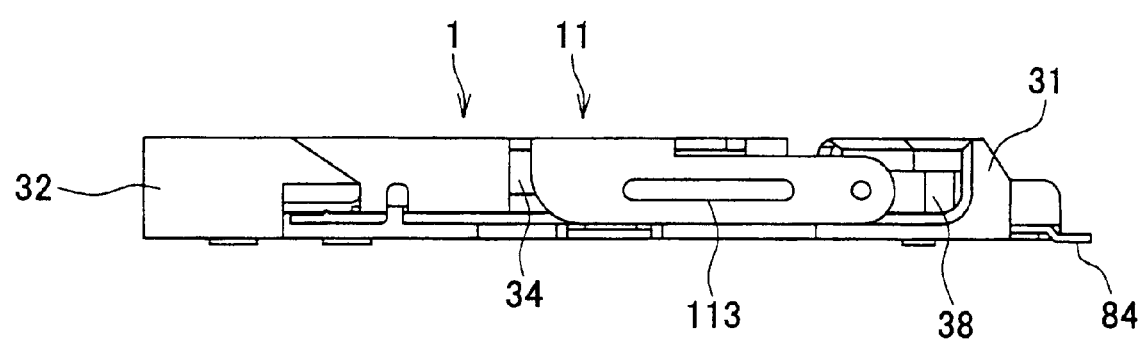
FIG. 4 is a side view of the card connector shown in FIG. 1.
Figure 5:
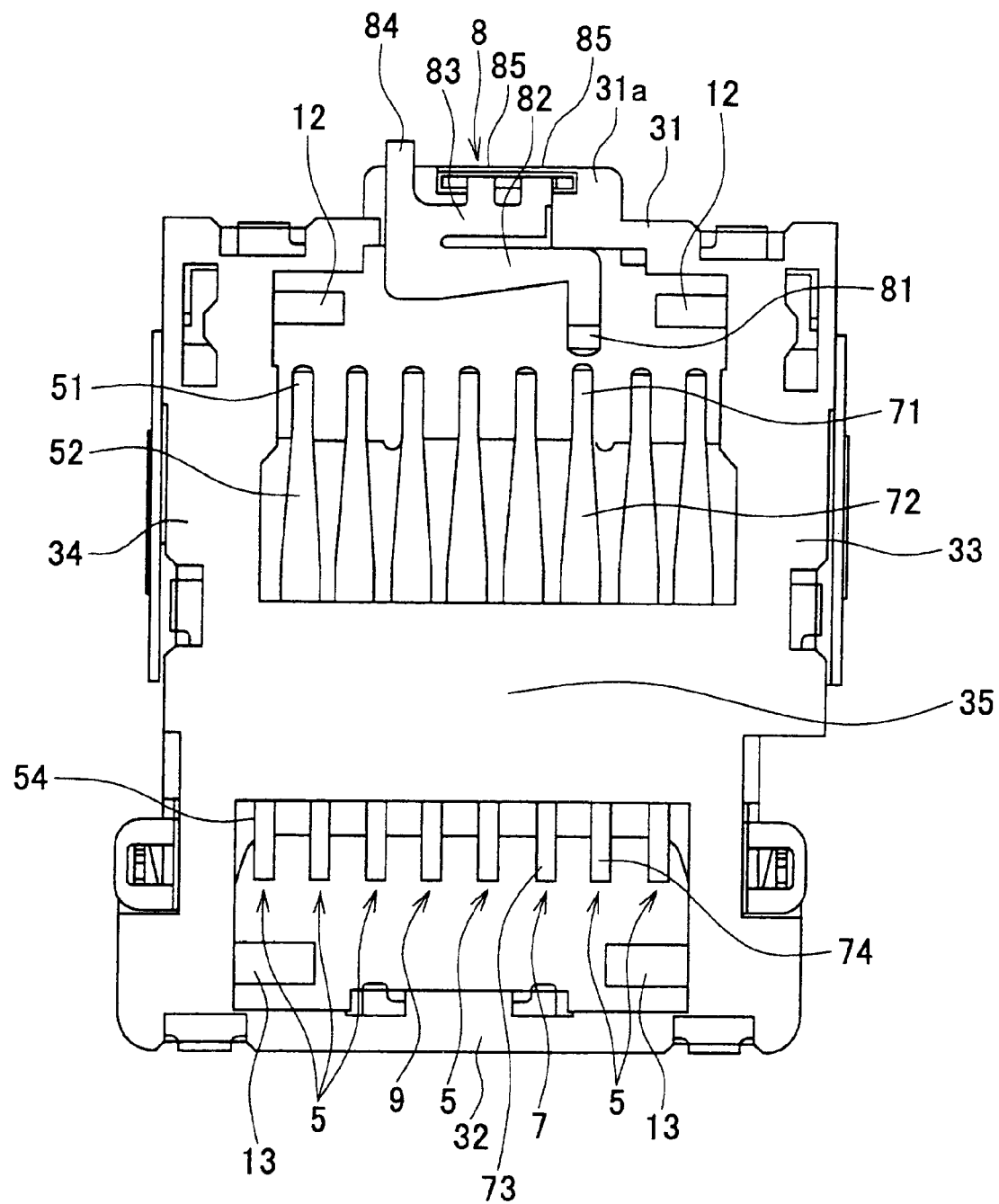
FIG. 5 is a bottom view of the card connector shown in FIG. 1.
Figure 6:
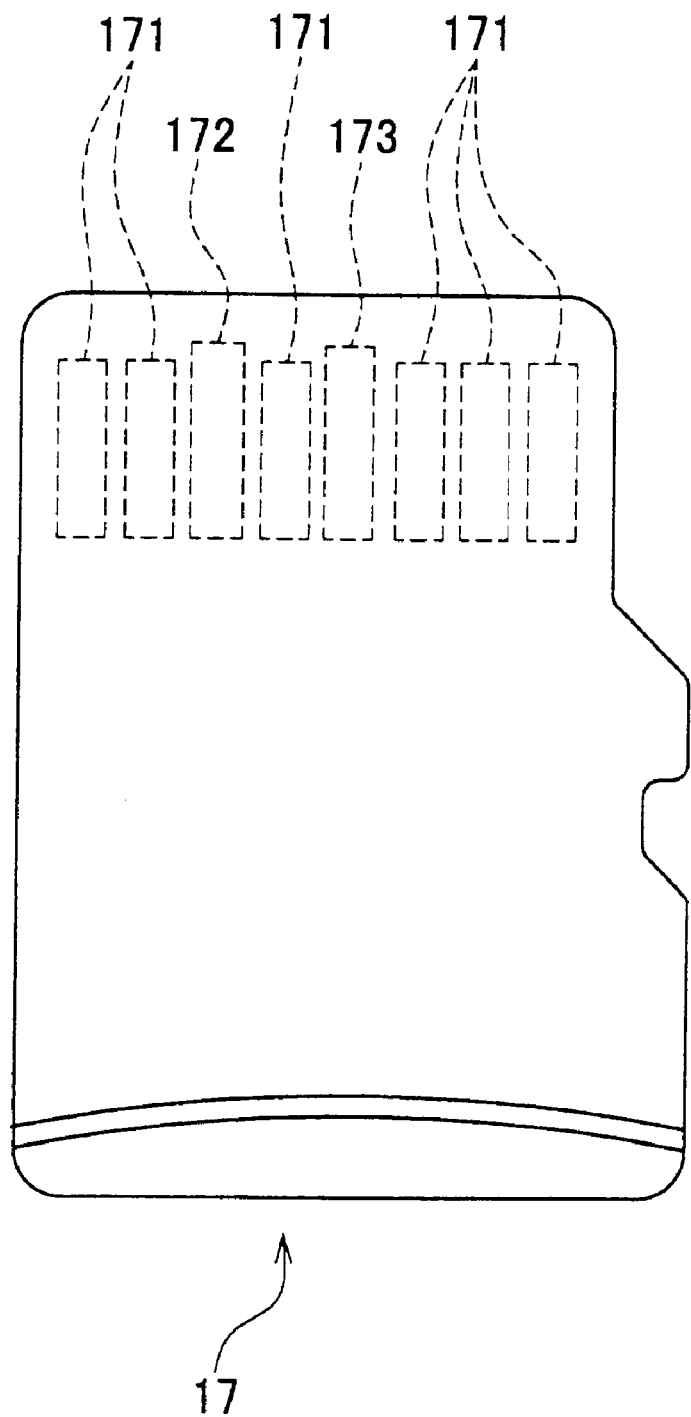
FIG. 6 is a plan view of an IC card which is connected to the card connector shown in FIG. 1.

FIG. 1 is a perspective view of a card connector according to a first embodiment of the present invention, as taken from above. FIG. 2 is a perspective view of the card connector shown in FIG. 1, as taken from below. FIG. 3 is a plan view of the card connector shown in FIG. 1. FIG. 4 is a side view of the card connector shown in FIG. 1. FIG. 5 is a bottom view of the card connector shown in FIG. 1. FIG. 6 is a plan view of an IC card which is connected to the card connector shown in FIG. 1.

As shown in FIGS. 1 to 5, the card connector is comprised of a housing 3, signal contacts 5, a first switch contact (ground-side detection contact) 7, a second switch contact (power-side detection contact) 8, a power contact 9, and a cover 11.

The housing 3 is substantially frame-shaped, and includes a front wall portion 31, a rear wall portion 32, side wall portions 33 and 34, and a contact holding portion 35 (see FIGS. 3 to 5).

The front wall portion 31 is formed with a protruding portion 31a which protrudes outward from the housing 3.

The rear wall portion 32 and the front wall portion 31 are parallel to each other.

One end of the side wall portion 33 is connected to one end of the front wall portion 31, and the other end of the side wall portion 33 is connected to one end of the rear wall portion 32.

One end of the side wall portion 34 is connected to the other end of the front wall portion 31, and the other end of the side wall portion 34 is connected to the other end of the rear wall portion 32.

The contact holding portion 35 is connected to the opposite side wall portions 33 and 34 in a bridged manner. The contact holding portion 35 is corresponded to a bottom wall portion of the housing 3. Holes 35a are formed in an upper surface of the contact holding portion 35 (see FIG. 7). The holes 35a expose parts of buried portions 53, 73, and 93, referred to hereinafter, of the respective contacts 5, 7, and 9. Through the holes 35a, probe pins for examination, not shown, are pressed against the contacts 5, 7, and 9.

The front wall portion 31, the rear wall portion 32, the opposite side wall portions 33 and 34, and the contact holding portion 35 form an accommodating space (accommodating portion) 36. The accommodating space 36 is a space for accommodating an IC card 17 having a plurality of connection pads. The direction of inserting/removing the card 17 into/from the accommodating space 36 substantially coincides with a direction Y (see FIG. 1) of the thickness of the housing 3.

As shown in FIG. 6, a plurality of signal connection pads 171, one ground connection pad (a desired connection pad out of the plurality of connection pads) 172, and one power connection pad 173 are arranged at equally-spaced intervals on a bottom surface of the IC card 17. The ground connection pad 172 has a length little longer than that of each signal connection pad 171. The power connection pad 173 has the same length as that of the ground connecting pad 172.

As shown in FIG. 2, each signal contact 5 includes a contact portion 51, a spring portion 52, the buried portion 53 (see FIG. 7), and a terminal portion 54.

The contact portion 51 is brought into contact with an associated one of the signal connection pads 171 of the IC card 17 accommodated in the accommodating space 36.

The spring portion 52 is connected to the contact portion 51, and presses the contact portion 51 against an associated one of the signal connection pads 171.

Figure 7:
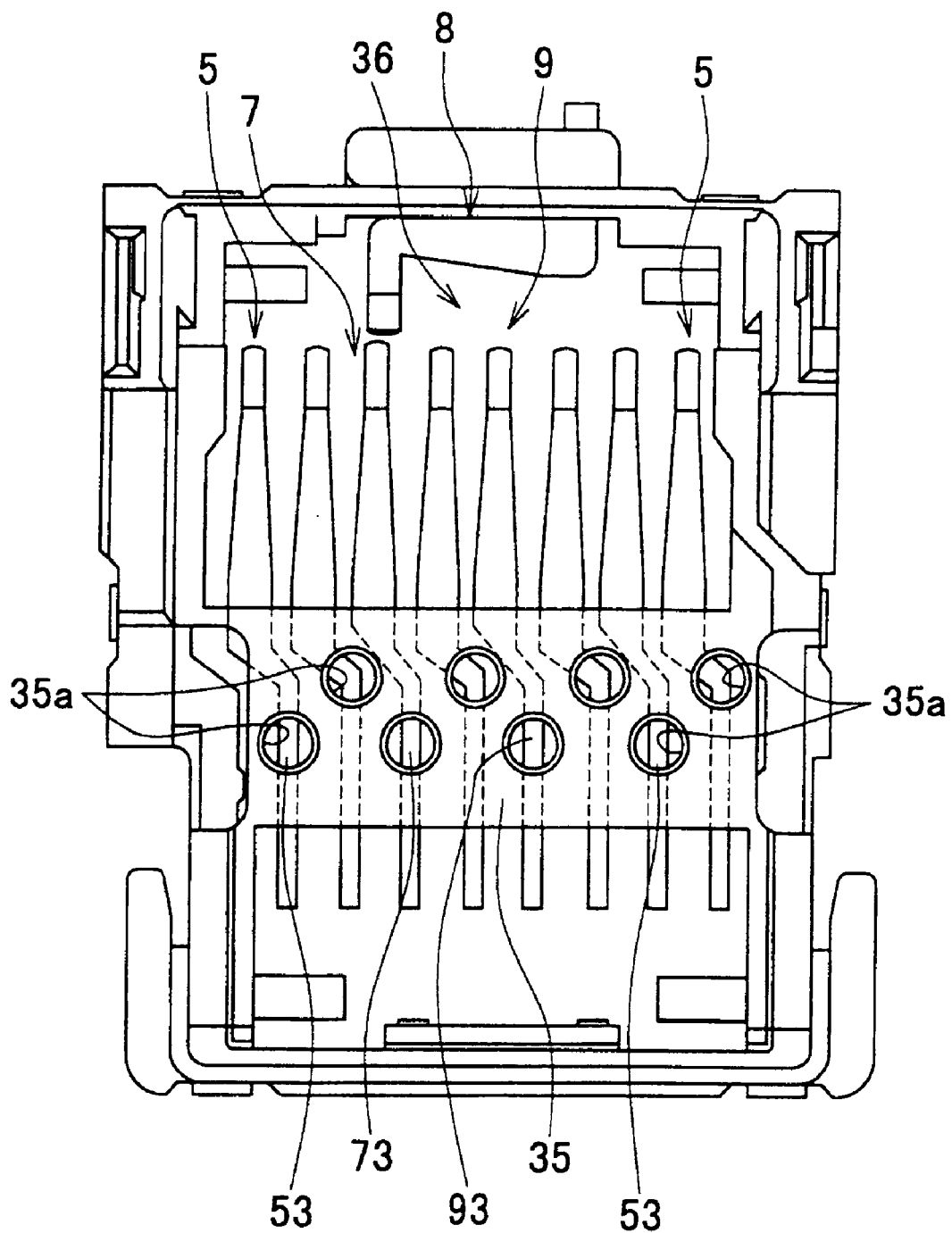
FIG. 7 is a plan view showing a state in which the card connector shown in FIG. 1 is not loaded with the IC card.

The buried portion 53 is connected to the spring portion 52, and is buried in the contact holding portion 35 by so-called mold-in molding (see FIG. 7).

The terminal portion 54 is connected to the buried portion 53, and is connected to a signal connection pad of a printed circuit board, not shown.

Figure 9:
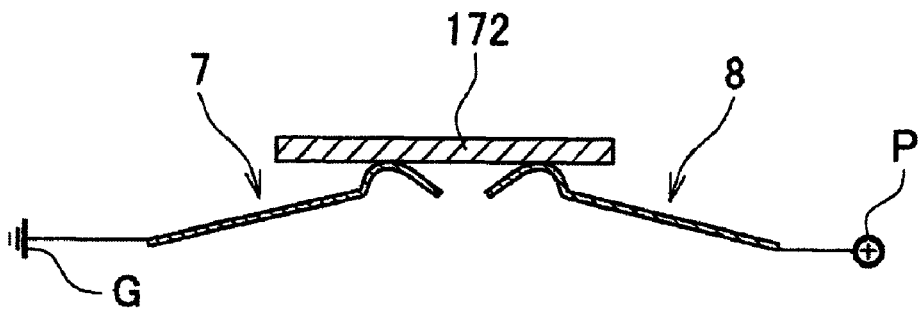
FIG. 9 is a conceptual view showing a state in which a first switch contact and a second switch contact of the card connector shown in FIG. 1 are brought into contact with a ground connection pad of the IC card.

The first switch contact 7 is connected to a ground G (see FIG. 9). As shown in FIG. 2, the first switch contact 7 includes a contact portion 71, a spring portion 72, a buried portion 73 (see FIG. 7), and a terminal portion 74.

The contact portion 71 is brought into contact with the ground connection pad 172 of the IC card 17 accommodated in the accommodating space 36.

The spring portion 72 is connected to the contact portion 71, and presses the contact portion 71 against the ground connection pad 172.

The buried portion 73 is connected to the spring portion 72, and is buried in the contact holding portion 35 by so-called mold-in molding (see FIG. 7).

The terminal portion 74 is connected to the buried portion 73, and is connected to the ground connection pad of the printed circuit board, not shown.

The second switch contact 8 includes a contact portion 81, a spring portion 82, a fixing portion 83, a terminal portion 84, and a press-fitting portion 85. The second switch contact 8 is connected to the power supply P (see FIG. 9).

The contact portion 81 is brought into contact with the ground connection pad 172 of the IC card 17 accommodated in the accommodating space 36.

The spring portion 82 is substantially L-shaped. The spring portion 82 is connected to the contact portion 81, and presses the contact portion 81 against the ground connection pad 172.

The fixing portion 83 is connected to the spring portion 82, and is disposed on a lower surface of the protruding portion 31*a* of the front wall portion 31.

The terminal portion 84 is connected to the fixing portion 83, and is connected to a power connection pad or the ground connection pad of the printed circuit board, not shown.

The press-fitting portion 85 is connected to the fixing portion 83. The press-fitting portion 85 is press-fitted into the protruding portion 31*a*.

The first switch contact 7 and the second switch contact 8 function as a detection switch for detecting whether or not the IC card 17 is connected to the card connector. Whether or not the IC card 17 is present is detected based on the ON or OFF state between the first switch contact 7 and the second switch contact 8.

The power contact 9, as shown in FIG. 2, includes a contact portion 91, a spring portion 92, the buried portion 93, and a terminal portion 94.

The contact portion 91 is brought into contact with the power connection pad 173 of the IC card 17 accommodated in the accommodating space 36.

The spring portion 92 is connected to the contact portion 91, and presses the contact portion 91 against the power connection pad 173.

The buried portion 93 is connected to the spring portion 92, and is buried in the contact holding portion 35 by so-called mold-in molding (see FIG. 7).

The terminal portion 94 is connected to the buried portion 93, and is connected to a power connection pad of the printed circuit board, not shown.

The signal contact 5, the first switch contact 7, and the power contact 9 are components having the same shape, and are different in respect of use. The signal contacts 5, the first switch contact 7, and the power contact 9 are arranged in the housing 3 at equally-spaced intervals along a contact arranging direction X (see FIG. 1).

The cover 11, as shown in FIG. 1, includes a cover main body 111, and a pair of arms 112 and 113. The cover main body 111 covers a central portion of an upper surface of the housing 3. The pair of arms 112 and 113 are connected to the cover main body 111. The pair of arms 112 and 113 include axial portions 112*a* and 113*a*, respectively (see FIG. 3). The axial portion 112*a* and the axial portion 113*a* are supported by a groove 38 of the side wall portion 33 and a groove 38 of the side wall portion 34, respectively, such that they are rotatable and at the same time are movable in the longitudinal direction of the side wall portions 33 and 34. Therefore, the cover 11 is rotatable about the axial portions 112*a* and 113*a*, which makes it possible to open and close the accommodating space 36 of the housing 3. Further, the cover 11 is movable along the longitudinal direction (longitudinal direction Z of the housing 3) of the side wall portions 33 and 34 in a state in which the accommodating space 36 is closed, and when the cover 11 is moved toward the rear wall portion 32, part of the cover 11 and part of the housing 3 are engaged, which causes the cover 11 to be held on the housing 3. As a result, a state in which the accommodating space 36 is covered by the cover 11 is maintained. If the cover 11 is moved toward the front wall portion 31 from this state, the cover 11 and the housing 3 are disengaged, whereby it is possible to open the cover 11.

Holddowns 12 are attached to respective one ends of the side wall portions 33 and 34, and holddowns 13 are attached to respective other ends of the side wall portions 33 and 34 (see FIG. 2).

Figure 8:
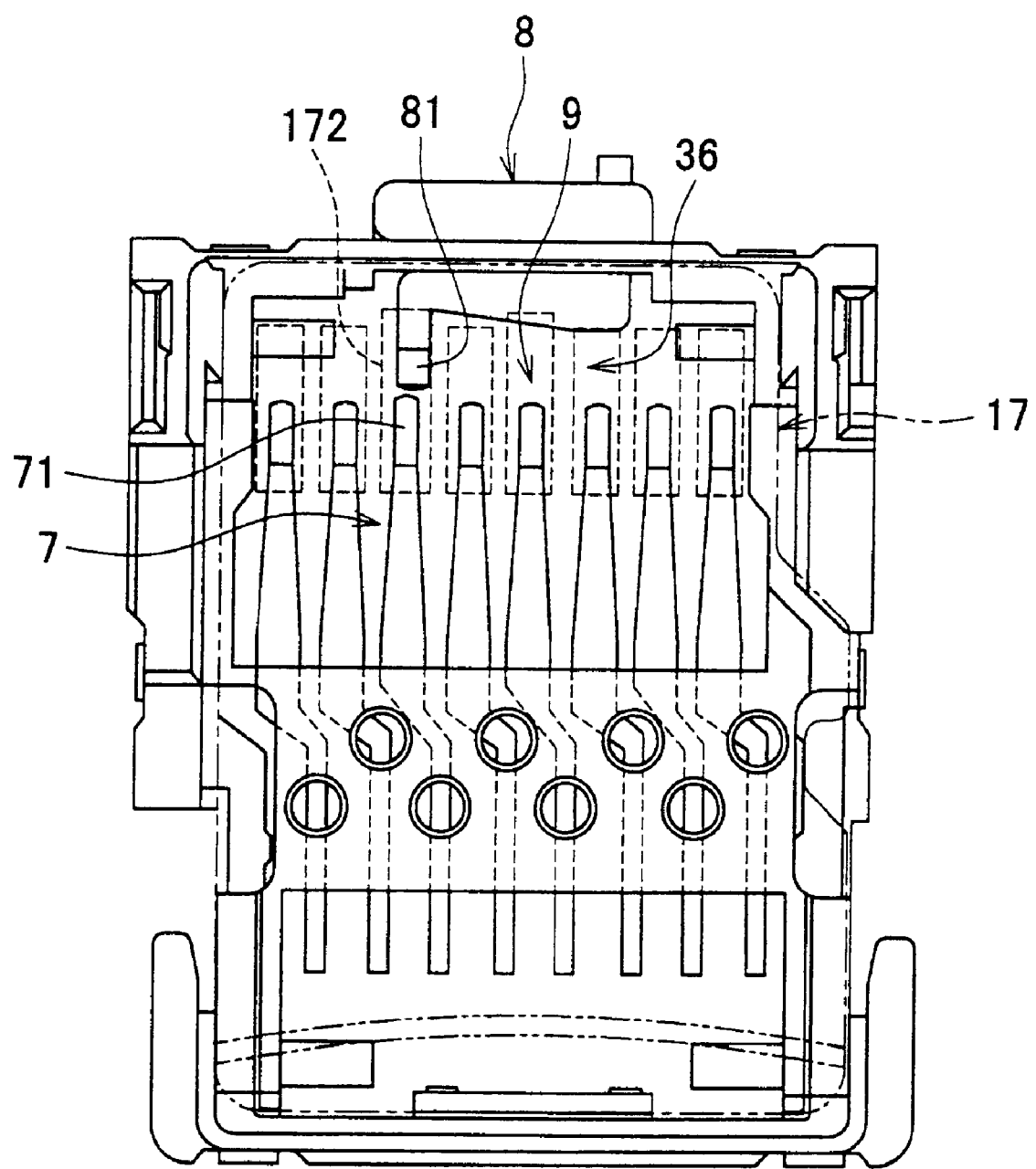
FIG. 8 is a plan view showing a state in which the card connector shown in FIG. 1 is loaded with the IC card.

FIG. 7 is a plan view showing a state in which the card connector shown in FIG. 1 is not loaded with the IC card. FIG. 8 is a plan view showing a state in which the card connector shown in FIG. 1 is loaded with the IC card. FIG. 9 is a conceptual view showing a state in which a first switch contact and a second switch contact of the card connector shown in FIG. 1 are brought into contact with a ground connection pad of the IC card. It should be noted that an illustration of the cover is omitted in FIGS. 7 and 8.

To connect the IC card 17 to the card connector, the cover 11 (see FIG. 1) is rotated around the axial portions 112*a* and 113*a* to be at right angles to an opening of the housing 3, whereby the accommodating space 36 of the housing 3 is opened.

Next, as shown in FIG. 8, the IC card 17 is accommodated in the accommodating space 36.

Thereafter, the cover 11 is rotated to be returned to the initial position, whereby the accommodating space 36 is closed (see FIG. 1).

Next, the axial portions 112*a* and 113*a* of the cover 11 are slid toward the rear wall portion 32 along the grooves 38 of the housing 3, and part of the cover 11 is engaged with part of the housing 3, whereby the cover 11 is held on the housing 3.

At this time, the contact portion 71 of the first switch contact 7 and the contact portion 81 of the second switch contact 8 are brought into contact with the same ground connection pad 172 of the IC card 17 by a fixed contact force. Therefore, as shown in FIG. 9, the first switch contact 7 and the second switch contact 8 are electrically connected to each other via the ground connection pad 172, whereby a voltage drop occurs in a switch-side circuit, which makes it possible to detect that the IC card 17 is connected to the card connector.

According to the present embodiment, each signal contact 5, the first switch contact 7, and the power contact 9 have the same shape, and are formed as common parts, which makes it possible to reduce the manufacturing costs.

Further, differently from the conventional card connector, a space for largely elastically deforming the contact spring piece in the direction of inserting/removing the IC card (longitudinal direction Z of the housing 3) is not required, and hence it is possible to realize downsizing of the card connector.

Figure 10:
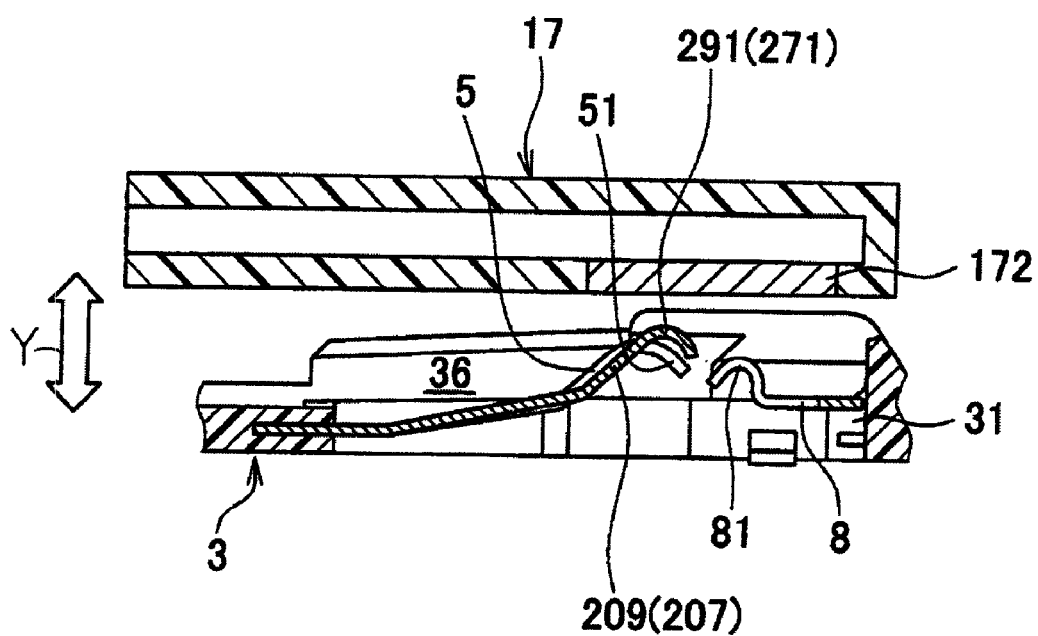
FIG. 10 is a conceptual view of a card connector according to a second embodiment of the present invention.
Figure 11:
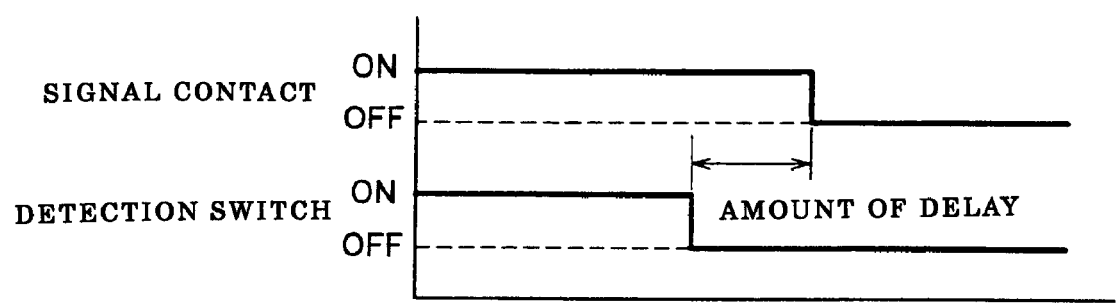
FIG. 11 is a graph showing a sequence of ON and OFF states of detection switches or the like of the card connector shown in FIG. 10.

FIG. 10 is a conceptual view of a card connector according to a second embodiment of the present invention. FIG. 11 is a graph showing a sequence of ON and OFF states of a detection switch etc. of the card connector shown in FIG. 10. It should be noted that a first switch contact 207 and a power contact 209 have the same shape, and although in FIG. 10, the first switch contact 207 is behind the power contact 209 and cannot be seen, the reference numeral of the first switch contact 207 is indicated in parentheses for convenience sake.

Component parts identical to those of the card connector according to the first embodiment are denoted by the same reference numerals, and detailed description thereof is omitted. Only main different components from those of the first embodiment will be described hereinafter.

The direction of inserting/removing the IC card 17 into/from the accommodating space 36 substantially coincides with the direction Y of the thickness of the housing 3.

A location (location in the direction Y of the thickness of the housing 3) of a contact portion 271 of the first switch contact 207 is substantially the same as a location (location in the direction Y of the thickness of the housing 3) of a contact portion 291 of the power contact 209, and is higher than the locations (locations in the direction Y of the thickness of the housing 3) of the contact portions 51 of the signal contacts 5. The locations of the contact portions 51 of the signal contacts 5 are higher than a location (location in the direction Y of the thickness of the housing 3) of the contact portion 81 of the second switch contact 8.

When the IC card 17 is pulled from the accommodating space 36, first, the ground connection pad 172 of the IC card 17 is moved away from the contact portion 81 of the second switch contact 8. At that time, as shown in FIG. 11, the detection switch is switched from the ON state to the OFF state. At this time, the power contact 209, the first switch contact 207, and the signal contacts 5 are brought into contact with respective associated connection pads 173, 172, and 171 (see FIG. 6) of the IC card 17, and as shown in FIG. 11, the signal contacts 5 are in the ON state, and the circuit of the IC card 17 is in the ON state. When the detection switch becomes the OFF state, it is detected that the IC card 17 is removed from the accommodating space 36, followed by terminating the program currently being executed.

If the IC card 17 is further lifted upward, the contact portions 51 of the signal contacts 5 are removed from the signal connection pads 171 of the IC card 17. At this time, the program of the IC card 17 has been terminated. That is, the power is supplied to the IC card 17 until the program of the IC card 17 is terminated, and hence the circuit of the IC card 17 is not adversely affected by the removal.

If the IC card 17 is further lifted upward, the contact portion 291 of the power contact 207 and the contact portion 271 of the first switch contact 207 are moved away from the power connection pad 173 and the ground connection pad 172, respectively.

As described above, in this embodiment, when the IC card 17 is pulled from the accommodating space 36, as shown in FIG. 11, a predetermined time lag is generated after the detection switch turns off until the signal contacts 5 turn off. Therefore, it is possible to protect the circuit of the IC card 17.

Figure 12:
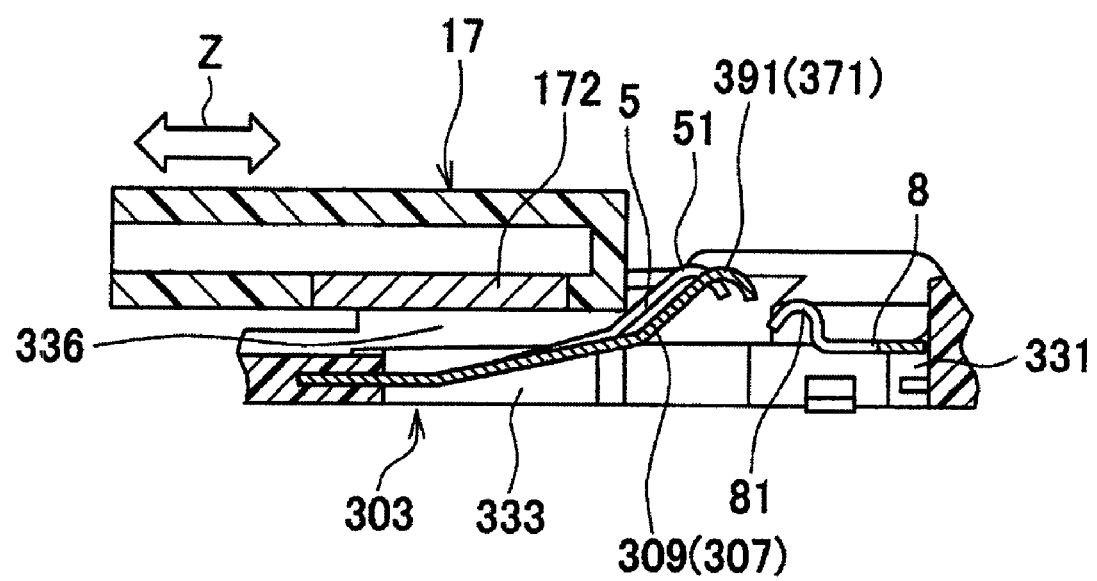
FIG. 12 is a conceptual view of a card connector according to a third embodiment of the present invention.

FIG. 12 is a conceptual view of a card connector according to a third embodiment of the present invention. It should be noted that although a first switch contact 307 and a power contact 309 have the same shape, and although in FIG. 12, the first switch contact 307 is behind the power contact 309 and cannot be seen, the reference numeral of the first switch contact 307 is indicated in parentheses for convenience sake.

Component parts identical to those of the card connector according to the first embodiment are denoted by the same reference numerals, and detailed description thereof is omitted. Only main different components from those of the first embodiment will be described hereinafter.

In the third embodiment, the direction of inserting/removing the IC card 17 into/from an accommodating space (accommodating portion) 336 of a housing 303 substantially coincides with the longitudinal direction Z of the housing 303.

A location (location in the longitudinal direction Z of the housing 303) of a contact portion 371 of the first switch contact 307 is substantially the same as a location (location in the longitudinal direction Z of the housing 303) of a contact portion 391 of the power contact 309, and is forward of locations (locations in the longitudinal direction Z of the housing 303) of the contact portions 51 of the signal contacts 5 (a direction toward a front wall 331 is assumed to be forward). The location (location in the longitudinal direction Z of the housing 303) of a contact portion 81 of the second switch contact 8 is forward of the contact portion 371 of the first switch contact 307.

When the IC card 17 is pulled from the accommodating space 336, similarly to the second embodiment, a predetermined time lag is generated after the detection switch turns off until the signal contacts 5 turn off. Therefore, it is possible to protect the circuit of the IC card 17.

It should be noted that although in the above-described embodiment, each of the first switch contacts 7, 207, and 307 is electrically connected to the second switch contact 8 via the same ground connection pad 172 of the IC card 17, another ground connection pad, not shown, which is electrically connected to the ground connection pad 172 may be provided on the IC card 17 in addition to the ground connection pad 172, and each of the first switch contacts 7, 207, and 307 may be electrically connected to the second switch contact 8 via the another ground connection pad.

Further, although in the above-described embodiment, each of the first switch contacts 7, 207, and 307 are electrically connected to the second switch contact 8 via the same ground connection pad 172 of the IC card 17, a short-circuiting connection pad only for short-circuiting each of the first switch contacts 7, 207, and 307 to the second switch contact 8 may be provided on the IC card 17, and each of the first switch contacts 7, 207, and 307 may be electrically connected to the second switch contact 8 via this connection pad dedicated to card detection.

It should be noted that although in the first embodiment, the signal contacts 5, the first switch contact 7, and the power contact 9 are formed as common parts, it is also possible to form the signal contacts 5, the first switch contact 7, the power contact 9, and the second switch contact 8 as common parts.

Further, although in the above-described embodiment, the ground connection pad is used as a connection pad for short-circuiting each of the first switch contacts 7, 207, and 307 to the second switch contact 8, the signal connection pad or the power connection pad may be used, or any other suitable connection pad may be used.

DESCRIPTION OF REFERENCE NUMERALS 3 housing
36, 336 accommodating space (accommodating portion)
5 signal contact
7, 207, 307 first switch contact (ground-side detection contact)
8 second switch contact (power-side detection contact)
9, 209, 309 power contact
17 IC card (electronic card)
171 signal connection pad
172 ground connection pad
173 power connection pad

What is claimed is:
1. A card connector comprising:
a plurality of contacts; and a housing which includes an accommodating portion for accommodating an electronic card having a plurality of connection pads, wherein the housing holds the plurality of contacts, wherein the plurality of contacts include a power-side detection contact and a ground-side detection contact which are electrically connected to each other by being brought into contact with a desired connection pad of the plurality of connection pads when the electronic card is accommodated in the accommodating portion, wherein the power-side detection contact includes a contact portion for being brought into contact with the desired connection pad, and a spring portion for urging the contact portion against the desired connection pad, wherein the contact portion of the power-side detection contact is connected to the spring portion, and the spring portion extends in a short-side direction of the housing, wherein the ground-side detection contact extends in a longitudinal direction of the housing, and wherein the ground-side detection contact includes a contact portion arranged adjacent to the contact portion of the power-side detection contact in the longitudinal direction of the housing.

2. The card connector as claimed in claim 1,
wherein the plurality of contacts further include other contacts, and
wherein at least one of the power-side detection contact and the ground-side detection contact has a same shape as a shape of the other contacts.

3. The card connector as claimed in claim 1, wherein a direction of inserting/removing the electronic card into/from the accommodating portion substantially coincides with a direction of a thickness of the housing, wherein the plurality of contacts further include signal contacts, and a power contact, the signal contacts being brought into contact with signal connection pads of the plurality of connection pads, and the power contact being brought into contact with a power connection pad of the plurality of connection pads, when the electronic card is accommodated in the accommodating portion, wherein a location of the contact portion of the ground-side detection contact in the direction of the thickness of the housing is substantially the same as a location of a contact portion of the power contact in the direction of the thickness of the housing, and at the same time is higher than locations of respective contact portions of the signal contacts in the direction of the thickness of the housing, and wherein the locations of the contact portions of the signal contacts in the direction of the thickness of the housing are higher than the location of the contact portion of the power-side detection contact in the direction of the thickness of the housing.

4. The card connector as claimed in claim 1, wherein a direction of inserting/removing the electronic card into/from the accommodating portion substantially coincides with the longitudinal direction of the housing, wherein the plurality of contacts further include signal contacts, and a power contact, the signal contacts being brought into contact with signal connection pads of the plurality of connection pads, and the power contact being brought into contact with a power connection pad of the plurality of connection pads, when the electronic card is accommodated in the accommodating portion, wherein a location of the contact portion of the ground-side detection contact in the longitudinal direction of the housing is substantially the same as a location of a contact portion of the power contact in the longitudinal direction of the housing, and at the same time is forward of locations of respective contact portions of the signal contacts in the longitudinal direction of the housing, and wherein the locations of the contact portions of the signal contacts in the longitudinal direction of the housing are rearward of the location of the contact portion of the power-side detection contact in the longitudinal direction of the housing.

5. The card connector as claimed in claim 2,
wherein a direction of inserting/removing the electronic card into/from the accommodating portion substantially coincides with a direction of a thickness of the housing, wherein the other contacts include signal contacts, and a power contact, the signal contacts being brought into contact with signal connection pads of the plurality of connection pads, and the power contact being brought into contact with a power connection pad of the plurality of connection pads, when the electronic card is accommodated in the accommodating portion, wherein a location of the contact portion of the ground-side detection contact in the direction of the thickness of the housing is substantially the same as a location of a contact portion of the power contact in the direction of the thickness of the housing, and at the same time is higher than locations of respective contact portions of the signal contacts in the direction of the thickness of the housing, and wherein the locations of the contact portions of the signal contacts in the direction of the thickness of the housing are higher than the location of the contact portion of the power-side detection contact in the direction of the thickness of the housing.

6. The card connector as claimed in claim 2,
wherein a direction of inserting/removing the electronic card into/from the accommodating portion substantially coincides with the longitudinal direction of the housing, wherein the other contacts include signal contacts, and a power contact, the signal contacts being brought into contact with signal connection pads of the plurality of connection pads, and the power contact being brought into contact with a power connection pad of the plurality of connection pads, when the electronic card is accommodated in the accommodating portion, wherein a location of the contact portion of the ground-side detection contact in the longitudinal direction of the housing is substantially the same as a location of a contact portion of the power contact in the longitudinal direction of the housing, and at the same time is forward of locations of respective contact portions of the signal contacts in the longitudinal direction of the housing, and wherein the locations of the contact portions of the signal contacts in the longitudinal direction of the housing are rearward of the location of the contact portion of the power-side detection contact in the longitudinal direction of the housing.

* * * * *